United States Patent Office 2,889,485
Patented June 2, 1959

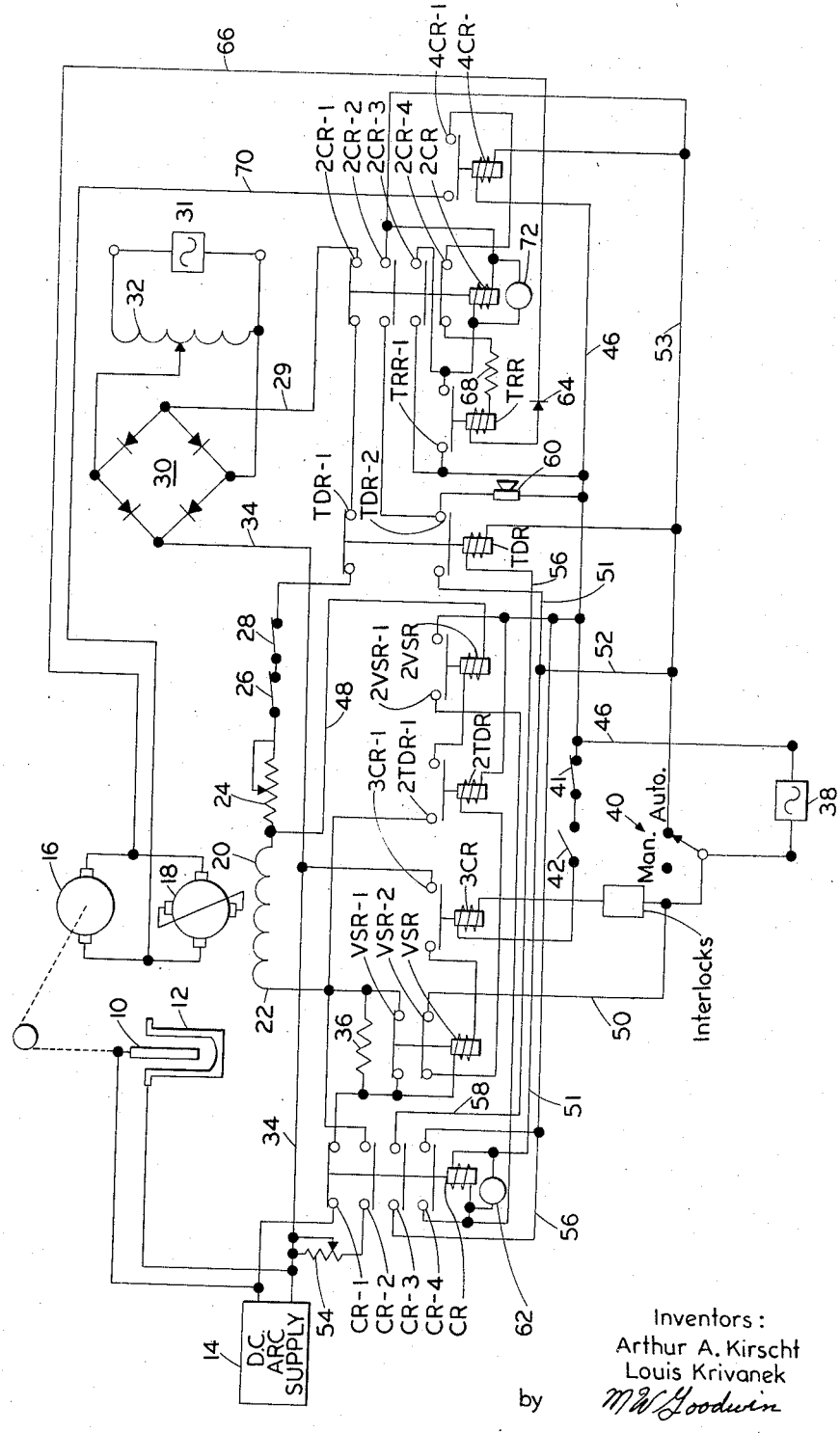

2,889,485

ELECTRODE DRIVE CONTROL FOR ELECTRIC ARC FURNACE

Arthur A. Kirscht, Pittsfield, Mass., and Louis Krivanek, Shelbyville, Ind., assignors to General Electric Company, a corporation of New York Application April 10, 1958, Serial No. 727,689

10 Claims. (Cl. 314—68)

The invention relates to electric arc furnaces and more particularly to novel improvements in a control system for the electrode drive of a consumable electrode type electric arc furnace.

In an electric arc furnace of the consumable electrode type, the heat for the furnace is provided by an arc between an molten pool of metal in a crucible and an electrode fabricated of the metal to be melted with the electrode being consumed by the heat of the arc. The operation of such a furnace requires that the position of the electrode be adjusted relative to the molten pool in accordance with the consumption of the electrode; and in order to obtain a metallurgically acceptable ingot, it is necessary that the distance between the electrode and molten pool be accurately controlled. Safety of operation also necessitates accurate control of the electrode movement, in that if the arc gap is too long there may be a tendency of the arc to wander from the center of the pool toward the wall of the crucible with the attendant possibility of a burn-through of the crucible wall. On the other hand, if the arc gap becomes so small that the electrode touches the pool, the electrode may become welded to the ingot.

One known method of providing an accurate automatic control of electrode movement is to provide a control mechanism responsive to the arc voltage, which mechanism is connected to the electrode drive mechanism to actuate the same to raise the electrode if the arc voltage falls below a predetermined value and to lower the electrode if the arc voltage goes above a predetermined value. While such a control is generally satisfactory for normal furnace operation, it does not in its basic form perform certain functions which it is desirable to provide for purposes of ease and safety of performance. For example, to initiate a melt, it has heretofore been a common practice for the furnace operator to lower the electrode, under manual control, until it engages a quantity of metal at the bottom of the crucible and then to immediately raise the electrode, thus striking the arc. Such an operation requires considerable skill on the part of the operator to avoid sticking the electrode into the melt, which would require a shut-down of the furnace and disassembly of the crucible in order to remove the electrode from the starting quantity of material. Also, during a melt certain conditions may arise wherein the automatic control cannot make the necessary correction in electrode position or wherein the control may overcorrect. It therefore is desirable to provide automatic means for recognizing such a condition and which will operate to prevent continuation of the condition.

Another problem arises in connection with what is referred to as a "glow discharge" condition in the furnace. The condition may occur in a furnace wherein the melt takes place within an evacuated enclosure and exists when the arc becomes quite diffused, whereby it has a much reduced electrode melting ability. There is also the possibility that the glow condition or arc diffusion might creep up the electrode and cause damage to the furnace. Under a glow condition, the arc voltage is lower than with a hard firm arc and, accordingly, a basic electrode drive control, such as described above, would, in the event of such a condition, raise the electrode and lengthen the arc which would further aggravate the condition and result in further raising of the electrode and so on.

It is the overall and primary object of the invention to provide, in an automatic electrode drive control system, novel improvements and features which will materially increase the safety and ease of operation of a furnace of the type described.

It is a more specific object of the invention to provide in an automatic electrode drive control system of the type which is responsive to changes in arc voltage, a novel improvement, whereby the operation of striking the arc may be accomplished automatically, thus eliminating the need for operator skill in initiating the melt.

It is another object of this invention to provide, in a control system of the type just described, a novel improvement whereby the electrode will be automatically retracted a predetermined distance and the automatic control made inoperative if an electrode control condition should occur for which the automatic control cannot correct.

It is further an object of this invention to provide, in a control system of the type described, a novel improvement which will detect a glow discharge condition within an electric arc furnace and render the automatic control inoperative to prevent aggravation of the glow discharge condition.

In carrying out this invention, there is provided a basic automatic control for an electrode drive, which is known in the art and which generally comprises an amplidyne, the control field of which is connected between a source of reference voltage and a source of arc voltage connected to the electrode and crucible of a furnace. The armature of the amplidyne is connected to a reversible direct current motor which is drivingly connected to the electrode. The direction of current flow from the armature of the amplidyne is determined by the direction of current flow through its control field, and the motor is connected to the armature of the amplidyne so that if the reference voltage is higher than the arc voltage, the motor will operate in an electrode raising direction while, if the arc voltage is higher than the reference voltage, the motor will lower the electrode.

To the basic control has been added a voltage-sensitive means in the form of a relay connected so as to be responsive to the arc voltage and a resistance which is connected so as to be placed in series between the electrode amplidyne field by contacts of the relay. The voltage-sensitive relay is actuated only during the initiation of a melt when, prior to striking of an arc, the open-circuit voltage of the arc power supply will be applied to the relay. This open-circuit voltage of say 80 volts, being substantially greater than the reference voltage of say 40 volts, the amplidyne will cause the electrode drive motor to lower the electrode, but at a reduced speed because of the resistance in a series with the amplidyne field. As soon as the electrode touches the metal in the bottom of the crucible, the voltage at the electrode and crucible will drop sharply below normal arc voltage and the voltage-sensitive relay will be de-energized to remove the resistance from in series with the amplidyne field. Inasmuch as the arc voltage will at this instant be much less than the reference voltage, the amplidyne will cause the electrode to be raised rapidly until the desired arc length is reached, whereupon the furnace is immediately under automatic control. Thus, the starting operation may be accomplished automatically, eliminating operator skill; assuring a smooth, fast start; and precluding the possibility of having the electrode stuck in the starting material with an attendant loss of set-up time.

Additional voltage-sensitive means have been added to the basic control with this additional means including a voltage sensitive relay connected so as to be responsive to the differential between the arc voltage and the reference voltage. There is also provided a second relay actuated by the voltage-sensitive relay to disconnect the arc voltage side of the amplidyne field from the electrode and connect it through a resistance to the reference voltage to effect electrode raising. A time delay relay initially energized by the second relay effects a disconnection of the amplidyne field after a sufficient raising of the electrode. In this manner, the electrode is raised for a predetermined interval and then the electrode drive is rendered inoperative whenever the differential between the arc and reference voltage exceeds a predetermined value, of say 7 or 8 volts.

To provide a means of detecting a glow discharge condition in a furnace, time-current integrating control means in the form of a series-connected contact-type rectifier and a thermal responsive relay are provided between the amplidyne and electrode drive motor for response to continuous energizing of the drive motor in an electrode raising direction for a predetermined interval, which would be indicative of a glow discharge condition. The integrating control means further includes means actuated by the relay to render the automatic electrode drive inoperative if a glow discharge condition should occur.

For a complete understanding of the invention, together with further objects and advantages thereof, reference is made to the following description, taken in conjunction with the accompanying drawing in which the single figure depicts in schematic form an exemplary automatic electrode drive control system embodying this invention.

With reference to the drawing, the control system illustrated therein is shown in conjunction with an electrode 10 and a crucible 12 connected respectively to the opposite sides of a direct current arc supply 14. The electrode is drivingly connected to a reversible direct current motor 16 which in turn is connected to the armature of an amplidyne 18. The control field 20 of the amplidyne is connected at one end by line 22, through the normally closed contacts VSR–1 of a relay VSR, to the normally closed contacts CR–1 of a relay CR, and then to the side of the arc voltage supply 14 connected to the electrode 10. The other end of the amplidyne field 20 is connected through a variable resistance 24, a pair of series-connected, normally closed electrode movement limit switches 26, 28, the normally closed contacts TDR–1 of a time delay relay TDR, and the normally closed contacts 2CR–1 of a relay 2CR, to a line 29 connected to one side of the output of a bridge rectifier 30. The input of the rectifier 30 is connected to a source of alternating current 31, and the other side of the output of the rectifier 30 is connected to a ground return line 34 leading to the side of the arc power supply 14 which is connected to the crucible 12.

The circuit, as thus far described, comprises the basic amplidyne control for electrode movement. In operation, the variable transformer 32 is adjusted to the desired reference voltage consistent with the arc voltage it is desired to maintain. When the arc voltage is larger than the reference voltage, current will flow through the amplidyne field 20 from the line 22 to the resistance 24 to effect energizing of the motor 16 in an electrode lowering direction. Conversely, when the arc voltage is lower than the reference voltage, current will flow through the field 20 in the opposite direction to effect raising of the electrode. Thus, an automatic adjustment of electrode position is provided in response to a differential between arc voltage and a predetermined voltage.

The automatic arc striking feature of this invention is achieved, in the embodiment shown, through the use of the voltage sensitive relay VSR, the actuating coil of which is connected at one side to the relay contacts CR–1 and thus to the electrode 10, the other side of the relay being connected through the normally open contacts 3CR–1 of a relay 3CR to the line 34 connecting to the crucible 12. The relay VSR is selected to have an actuating voltage which is substantially greater than the arc voltage encountered during normal furnace operation. A resistance 36 is connected across the contacts VSR–1 whereby the resistance will be placed in series with the amplidyne field 20 when the relay VSR is energized and the contacts VSR–1 are open. The value of the resistance 36 is, in a preferred embodiment, selected to provide for operation of the motor 16 at approximately one-half its normal speed.

The actuating coil of the relay 3CR is connected at one end to a source of alternating current 38, the movable contactor of a double-pole, single-throw switch 40, and through a plurality of interlocks for preventing the energizing of or for de-energizing the relay 3CR if, for example, the cooling water system to the crucible 12 fails or the furnace reaches an undesirably high temperature. The other side of the coil for the relay 3CR is connected through a pair of series-connected, manually operable, single-pole, single-throw switches 42, 41, to line 46 which is adapted to be connected to the other side of the alternating current source 38.

To initiate a melt, the arc power supply and reference voltage power supply being energized, the switch 42 is closed to energize the relay 3CR and through the contacts 3CR–1 to connect the relay VSR across the electrode and crucible. The electrical circuit between the electrode and crucible, being open at this time, the relay VSR will be actuated to open the contacts VSR–1 and connect the resistor 36 in series with the amplidyne control field and reduce the speed of the motor 16. Upon striking of the arc, the voltage between the electrode and crucible will drop; and the relay VSR will drop out and the contacts VSR–1 will close to by-pass the resistor 36 whereby the electrode drive will be in normal automatic operation.

In accordance with the object of providing automatic retraction of the electrode and neutralizing of the electrode drive if the control cannot maintain the proper arc length, a voltage sensitive relay 2VSR is connected at one side by a line 48 to one side of the amplidyne field 20 and at the other side through the normally open contacts 2TDR–1 of a time delay relay 2TDR to the line 22 at the other side of the amplidyne field. The relay 2TDR is connected at one side to the line 46 from the A.-C. source 38 and at its other side through the normally closed contacts VSR–2 of the voltage-sensitive relay VSR to a line 50 leading to the A.-C. source 38. The relay 2VSR is selected to have an actuating voltage for closing its contacts which is greater than approximately one-half of the maximum differential voltage across the amplidyne field which is desired for normal automatic furnace operation.

The normally open contacts 2VSR–1 of the relay 2VSR are connected at one side to the line 46 to the A.-C. source 38 and at the other side to the actuating coil of the relay CR and to the holding contacts CR–4 of the relay CR. The other side of the relay CR is connected by a line 51 to a line 52 leading to a line 53 connected to the "automatic" contact of the selector switch 40 and thus to the A.-C. 38 when the switch is in "automatic." The normally open contacts CR–2 are connected at one side to the line 22 leading to the arc voltage side of the amplidyne field and at the other side to one end of a variable resistance 54, the other end and center tap of which are connected to the ground return line 34 for the amplidyne field. The normally open contacts CR–3 of the relay CR connect a line 56 leading to the A.-C. source line 46 to a line 58 leading to the actuating coil of the time delay relay TDR, the other end of the coil TDR being connected to the line 53 and thus to the A.-C. source 38 when the switch 40 is in "automatic." The normally open contacts TDR-2 of the relay TDR are connected between the line 51 and a horn 60, the other side of which is connected to the line 46. A signal light 62 is connected across the coil of the relay CR to indicate when this relay is energized.

It should be apparent from the foregoing description that, when the voltage across the amplidyne field exceeds a certain value determined by the relay 2VSR, the relay 2VSR will be actuated to energize the relay CR and through the contacts CR-1 to break the direct connection of the amplidyne field to the arc power supply and simultaneously through the contacts CR-2 to connect the field to the arc supply through the variable resistance 54. The contacts CR-3 will simultaneously energize the time delay relay TDR which when it times out will, by its contacts TDR-1, disconnect the reference voltage from the amplidyne field and neutralize the electrode drive.

The resistance 54 is adjusted to provide a voltage drop thereacross which is less than the minimum arc voltage normally encountered during furnace operation. Thus, when the resistance is connected to the amplidyne field, the electrode drive will move the electrode continuously upwardly until the relay TDR times out and disconnects the reference voltage from the amplidyne field. The extent of raising of the electrode is a function of the adjusted value of the resistance 54 and the interval required for the relay TDR to time out. In this connection, it is preferred that the relay TDR incorporate means for enabling an adjustment of its time out period. The operator is provided with a visual indication of the energizing of the relay CR by the light 62 and with an audible indication of the neutralizing of the electrode drive by the horn 60.

It should be noted that the relay 2TDR, being connected in series with normally closed contacts VSR-2, will be prevented from being energized during a starting operation due to the energizing of the relay VSR at this time. This assures that the relay 2VSR, which is in series with the normally open contacts 2TDR-1, will not be energized so as to neutralize the electrode drive during the starting operation at which time the voltage across the amplidyne field will be substantially greater than normal. As soon as the arc is struck, however, and the relay VSR drops out, the contacts VSR-2 will again be closed to energize the time delay relay 2TDR which, when it times out, will close the contacts 2TDR-1 and connect the relay 2VSR to the arc voltage side of the amplidyne field.

The detection of a glow discharge condition in a furnace associated with the control of this invention is provided by a thermal responsive relay TRR which is connected at one side through a unidirection current passing means in the form of a contact type rectifier 64 to one side of the amplidyne armature by a line 66. The other side of the relay TRR is connected in series with a resistance 68, the normally closed contacts 2CR-4 of the relay 2CR, the normally open contacts 4CR-1 of a relay 4CR, and to the other side of the amplidyne armature through a line 70. The actuating coil of the relay 4CR is connected at one side to the line 53 and at the other side to the line 46 whereby the relay will be energized to close its contacts 4CR-1 whenever the switch 40 is in "automatic" position. The normally open contacts TRR-1 of the relay TRR are connected between the line 46 and the one side of the coil of the relay 2CR, the other side of which is connected to the line 53. The relay 2CR is provided with a pair of holding contacts 2CR-3 connected across the contacts TRR-1. The relay 2CR is further provided with normally open contacts 2CR-2 connected between the alarm horn 60 and the line 53. A light 72 is connected across the relay 2CR to provide a visual indication of the energizing of this relay.

As heretofore mentioned, one of the characteristics of a glow discharge condition in an arc furnace is that the arc voltage is less than the normal arc voltage. Therefore, when such a condition exists, the amplidyne will energize the drive motor 16 continuously in an electrode raising direction. The rectifier 64 is connected so as to pass current only in a direction corresponding to electrode raising. In the event that current flows through the rectifier for an abnormal length of time, indicative of a glow discharge condition, the thermal responsive relay TRR will be energized to energize the relay 2CR which, through its contacts 2CR-1, will break the circuit between the amplidyne field and reference voltage, thus neutralizing the electrode drive. The energizing of the relay 2CR will also sound the alarm horn 60 and energize the light 72 to provide the operator with audible and visual indications of a neutralizing of the electrode drive because of a glow discharge condition. Whenever the electrode drive is neutralized by reason of the energizing of either the relay 2VSR or the relay TRR, the holding contacts of the relays CR and 2CR will maintain these relays energized, thus maintaining the drive in neutral condition until the operator moves the selector switch 40 to "manual" to break the circuit to the relays CR and 2CR and reset the control.

It is believed that the overall operation of the control system of this invention will be apparent from the foregoing and that a further description is not necessary. While the invention has been described in terms of the specific embodiment illustrated, it should be understood that it is not intended that the invention be limited to the specific embodiment shown and described and includes all modifications and alternative embodiments which fall within the scope of the appended claims.

What we claim as new and desire to secure by Letters Patent of the United States is:

1. In an automatic control system for an arc furnace having an oppositely movable electrode disposed within a crucible including an arc power supply, means for applying a reference voltage, and control means for moving the electrode in response to increase and decrease of arc voltage above and below the reference voltage, the improvement of voltage-sensitive means connected in the control system for response to arc voltage and including means connected to said control means for reducing the normal rate of electrode movement in response to actuation of said voltage sensitive means, said voltage sensitive means being constructed to be energized in response to a voltage between the electrode and crucible substantially higher than the reference voltage such as will occur in preparation for but prior to the striking of an arc whereby, during an arc striking operation but prior to striking the arc, the electrode will be lowered relatively slowly and, upon completion of the electrical circuit between the electrode and crucible, electrode movement will be reversed automatically and the electrode raised rapidly until the arc voltage and reference voltage are substantially the same.

2. In an automatic control system for an arc furnace having an electrode movable in opposite directions disposed within a crucible including means for applying voltage across the electrode and crucible, and control means mechanically connected to the electrode and electrically connected to the electrode and crucible for moving the electrode in response to and at a rate proportional to a differential in voltage between the voltage across the electrode and crucible and a predetermined voltage, voltage sensitive means connected to the control means and operative when the voltage across the electrode and crucible exceeds the predetermined voltage by a substantial amount such as occurs in preparation for but prior to striking of an arc, the voltage sensitive means including resistance means for providing an apparent decrease in voltage between the voltage across the electrode and crucible and said predetermined voltage in response to actuation of the voltage sensitive means.

3. In an automatic control system for an arc furnace having an oppositely movable electrode and a crucible including means for applying voltage across the electrode and crucible, and control means mechanically connected to the electrode and electrically connected to the electrode and crucible for moving the electrode in response to and at a rate proportional to a differential in voltage between the voltage across the electrode and crucible and a predetermined voltage, a voltage sensitive relay connected across the electrode and crucible and constructed for operation in response to a voltage substantially greater than said predetermined voltage, the relay having normally closed contacts connected between the electrode and the control means, and a resistance of predetermined value connected across said contacts.

4. In an automatic control system for an arc furnace having an oppositely movable electrode and a crucible including means for applying a voltage across the electrode and crucible and means for moving the electrode in response to a differential between arc voltage and a predetermined voltage, automatic arc striking means responsive to an arc voltage substantially in excess of said predetermined voltage to effect a reduction in the rate of electrode movement to that substantially below normal, and control means to condition the control system for electrode raising for a predetermined interval and upon termination of said interval to preclude further electrode movement, said control means being actuated in response to a predetermined increase and decrease of arc voltage above and below said predetermined voltage with a predetermined increase being less than the differential voltage required to actuate the automatic arc striking means, and means including the automatic arc striking means to render said control means inoperative during an arc striking operation and for a predetermined interval following the striking of an arc.

5. In an automatic control system for an arc furnace having an oppositely movable electrode and a crucible including means for applying power to the electrode and crucible, and means connected to the electrode for moving the same in response to increase and decrease of arc voltage above and below a reference voltage, voltage sensitive means connected in the control system so as to be responsive to the differential between the arc and reference voltages, said voltage sensitive means being constructed for the actuation thereof when said differential exceeds a predetermined value and including means to condition the control system for movement of the electrode in an arc lengthening direction for a predetermined interval and at the termination of said interval to halt electrode movement and preclude further electrode movement in either direction.

6. In an automatic control system for an arc furnace having a movable electrode disposed within a crucible, including an arc power supply connected to the electrode and crucible, a reference voltage supply and drive means for effecting movement of the electrode in opposite directions connected between the arc and reference voltage supplies and responsive to increase and decrease of the arc voltage above and below the reference voltage to move the electrode downwardly and upwardly respectively, voltage sensitive means connected between the arc and reference voltage supplies and operative to disconnect the drive means from the arc voltage supply and connect the same across the reference voltage supply in response to a predetermined voltage differential between the arc voltage and the reference voltage, and time delay means responsive to actuation of the voltage sensitive means to disconnect the drive means from the reference voltage supply upon expiration of a predetermined interval following actuation of said voltage sensitive means.

7. In an automatic control system for an arc furnace having an electrode movable in opposite directions within a crucible including means for supplying an arc producing voltage to the electrode and crucible, means for supplying a reference voltage, a reversible electric motor connected to the electrode for moving the same, and an amplidyne having its armature connected to the motor and having its control field connected between the arc and reference voltages, a voltage sensitive relay connected across the amplidyne control field for actuation of the relay in response to a predetermined differential voltage across the control field, a variable resistance, means responsive to actuation of said relay to disconnect the control field for the arc voltage and connect the same in series with the reference voltage and said variable resistance, and a time delay relay connected for energizing thereof in response to actuation of the voltage sensitive relay and including normally closed contacts connected between the reference voltage and amplidyne control field.

8. In an automatic control system for an arc furnace having a movable electrode, drive means connected to the electrode for moving the same in opposite directions and operative in response to increase and decrease of arc voltage above and below a predetermined value to lower and raise the electrode, and control means connected to the electrode drive means and operative to render the drive means inoperative to move the electrode in response to continuous operation of the drive means in the same direction for a predetermined interval.

9. In an automatic control system for an arc furnace having an oppositely movable electrode, a reversible direct current motor connected to the electrode for movement thereof, control means connected to the motor to effect operation thereof in response to increase and decrease of arc voltage above and below a predetermined value, and additional control means responsive to current flow to the motor in a predetermined direction for a predetermined interval connected in the control system to halt operation of the motor.

10. In an automatic control system for an arc furnace having an oppositely movable electrode, a reversible direct current motor connected to the electrode for driving the same, control means connected to the motor and operative to effect operation of the motor in opposite directions in response to increase and decrease of arc voltage above and below a predetermined value, a thermal responsive relay connected in the system so as to be responsive to current flow to the motor, unidirectional current carrying means connected in series with the relay, and switching means connected in the control system to render the motor inoperative in response to actuation of said switching means and connected for actuation in response to operation of said relay.

No references cited.